US010147091B2

(12) United States Patent
Gardiner et al.

(10) Patent No.: US 10,147,091 B2
(45) Date of Patent: Dec. 4, 2018

(54) SMART CARD SYSTEMS AND METHODS UTILIZING MULTIPLE ATR MESSAGES

(71) Applicant: Tactilis Sdn Bhd, Mont Kiara, Kuala Lumpur (MY)

(72) Inventors: Michael Gardiner, Kuala Lumpur (MY); Adriano Canzi, Los Angeles, CA (US)

(73) Assignee: TACTILIS SDN BHD, Kuala Lumpur (MY)

(*) Notice: Subject to any disclaimer, the term of this patent is extended or adjusted under 35 U.S.C. 154(b) by 680 days.

(21) Appl. No.: 14/616,069

(22) Filed: Feb. 6, 2015

(65) Prior Publication Data

US 2016/0232517 A1 Aug. 11, 2016

(51) Int. Cl.
| | | |
|---|---|---|
| *G06Q 20/40* | (2012.01) | |
| *G06Q 20/00* | (2012.01) | |
| *G06K 9/00* | (2006.01) | |
| *G06Q 20/34* | (2012.01) | |
| *H04L 29/06* | (2006.01) | |

(52) U.S. Cl.
CPC ......... *G06Q 20/40* (2013.01); *G06K 9/00087* (2013.01); *G06K 9/00979* (2013.01); *G06Q 20/341* (2013.01); *G06Q 20/409* (2013.01); *G06Q 20/4093* (2013.01); *G06Q 20/40145* (2013.01); *H04L 63/0853* (2013.01); *H04L 63/0861* (2013.01)

(58) Field of Classification Search
CPC .. G06Q 20/40; G06Q 20/409; G06Q 20/4015; H04L 63/0861
USPC .......................................................... 705/41
See application file for complete search history.

(56) References Cited

U.S. PATENT DOCUMENTS

| | | |
|---|---|---|
| 4,453,074 A | 6/1984 | Weinstein et al. |
| 4,582,985 A | 4/1986 | Loefberg |
| 4,725,719 A | 2/1988 | Oncken et al. |
| 4,747,147 A | 5/1988 | Sparrow |
| 4,910,521 A | 3/1990 | Mellon |
| 4,993,068 A | 2/1991 | Piosenka et al. |

(Continued)

FOREIGN PATENT DOCUMENTS

| | | |
|---|---|---|
| AU | 200238203 C | 11/2002 |
| AU | 757159 B2 | 2/2003 |

(Continued)

OTHER PUBLICATIONS

ISO 7816 Part 3: Electronic Signals and Transmission Protocols, www.cardwerk.com/smartcards/smartcard_standard_ISO7816-3.aspx, Jan. 12, 2015.*

(Continued)

*Primary Examiner* — Clifford B Madamba
(74) *Attorney, Agent, or Firm* — Sheppard Mullin Richter & Hampton LLP

(57) ABSTRACT

A system and method for facilitating communication between a smart card and a terminal, the method comprising receiving a first ATR message at a first time that is within a first predetermined clock cycles after a reset; waiting for a second ATR message indicative of a successful biometric authentication from the smart card; receiving the second ATR message at a second time that is within a second predetermined clock cycles after the first time; and exchanging transaction-related messages with the smart card.

20 Claims, 8 Drawing Sheets

(56) References Cited

U.S. PATENT DOCUMENTS

| | | |
|---|---|---|
| 5,175,416 A | 12/1992 | Mansvelt et al. |
| 5,180,901 A | 1/1993 | Hiramatsu |
| 5,180,902 A | 1/1993 | Schick et al. |
| 5,193,114 A | 3/1993 | Moseley et al. |
| 5,245,329 A | 9/1993 | Gokcebay |
| 5,259,649 A | 11/1993 | Shomron |
| 5,321,751 A | 6/1994 | Ray et al. |
| 5,438,184 A | 8/1995 | Roberts et al. |
| 5,461,217 A | 10/1995 | Claus et al. |
| 5,513,272 A | 4/1996 | Bogosian et al. |
| 5,521,363 A | 5/1996 | Tannenbaum |
| 5,521,966 A | 5/1996 | Friedes et al. |
| 5,534,857 A | 7/1996 | Laing et al. |
| 5,539,825 A | 7/1996 | Akiyama et al. |
| 5,541,985 A | 7/1996 | Ishii |
| 5,559,504 A | 9/1996 | Itsumi et al. |
| 5,559,887 A | 9/1996 | Davis et al. |
| 5,577,121 A | 11/1996 | Davis et al. |
| 5,578,808 A | 11/1996 | Taylor et al. |
| 5,581,630 A | 12/1996 | Bonneau et al. |
| 5,590,038 A | 12/1996 | Pitroda |
| 5,590,197 A | 12/1996 | Chen et al. |
| 5,602,918 A | 2/1997 | Chen et al. |
| 5,604,801 A | 2/1997 | Dolan et al. |
| 5,613,001 A | 3/1997 | Bakhoum |
| 5,677,953 A | 10/1997 | Dolphin |
| 5,703,753 A | 12/1997 | Mok |
| 5,721,781 A | 2/1998 | Deo et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,757,917 A | 5/1998 | Rose et al. |
| 5,764,789 A | 6/1998 | Pare, Jr. et al. |
| 5,778,173 A | 7/1998 | Apte et al. |
| 5,796,831 A | 8/1998 | Paradinas et al. |
| 5,799,087 A | 8/1998 | Rosen |
| 5,806,045 A | 9/1998 | Biorge et al. |
| 5,815,252 A | 9/1998 | Price et al. |
| 5,815,657 A | 9/1998 | Williams et al. |
| 5,826,241 A | 10/1998 | Stein et al. |
| 5,826,243 A | 10/1998 | Musmanno et al. |
| 5,835,894 A | 11/1998 | Adcock et al. |
| 5,838,818 A | 11/1998 | Herley et al. |
| 5,857,079 A | 1/1999 | Claus et al. |
| 5,869,822 A | 2/1999 | Meadows et al. |
| 5,875,432 A | 2/1999 | Sehr |
| 5,884,271 A | 3/1999 | Pitroda |
| 5,884,292 A | 3/1999 | Baker et al. |
| 5,889,941 A | 3/1999 | Tushie |
| 5,892,211 A | 4/1999 | Davis et al. |
| 5,898,838 A | 4/1999 | Wagner |
| 5,901,239 A | 5/1999 | Kamei |
| 5,905,908 A | 5/1999 | Wagner |
| 5,907,620 A | 5/1999 | Klemba et al. |
| 5,912,446 A | 6/1999 | Wong et al. |
| 5,915,973 A | 6/1999 | Hoehn et al. |
| 5,917,913 A | 6/1999 | Wang et al. |
| 5,917,925 A | 6/1999 | Moore et al. |
| 5,920,058 A | 7/1999 | Weber et al. |
| 5,920,629 A | 7/1999 | Rosen |
| 5,920,847 A | 7/1999 | Kolling et al. |
| 5,930,767 A | 7/1999 | Reber et al. |
| 5,931,917 A | 8/1999 | Nguyen et al. |
| 5,936,226 A | 8/1999 | Aucsmith |
| 5,942,761 A | 8/1999 | Tuli |
| 5,978,495 A | 11/1999 | Thomopoulos |
| 5,987,155 A | 11/1999 | Dunn et al. |
| 5,988,497 A | 11/1999 | Wallace et al. |
| 5,991,411 A | 11/1999 | Kaufman |
| 5,995,014 A | 11/1999 | DiMaria |
| 6,012,039 A | 1/2000 | Hoffman et al. |
| 6,012,636 A | 1/2000 | Smith et al. |
| 6,016,476 A | 1/2000 | Maes et al. |
| 6,018,739 A | 1/2000 | McCoy et al. |
| 6,041,410 A | 3/2000 | Shi et al. |
| 6,045,956 A | 4/2000 | Kato |
| 6,047,281 A | 4/2000 | Wilson et al. |
| 6,047,282 A | 4/2000 | Wilson et al. |
| 6,060,815 A | 5/2000 | Nysen |
| 6,070,159 A | 5/2000 | Wilson et al. |
| 6,091,835 A | 7/2000 | Smithies et al. |
| 6,095,413 A | 8/2000 | Tetro et al. |
| 6,095,519 A | 8/2000 | Shoemaker, Jr. |
| 6,101,477 A | 8/2000 | Hohle et al. |
| 6,104,311 A | 8/2000 | Lastinger |
| 6,104,922 A | 8/2000 | Baumann et al. |
| 6,116,736 A | 9/2000 | Stark et al. |
| 6,120,461 A | 9/2000 | Smyth |
| 6,130,623 A | 10/2000 | MacLellan et al. |
| 6,148,093 A | 11/2000 | McConnell et al. |
| 6,154,879 A | 11/2000 | Pare, Jr. et al. |
| 6,175,656 B1 | 1/2001 | Hoang |
| 6,182,892 B1 | 2/2001 | Angelo et al. |
| 6,199,079 B1 | 3/2001 | Gupta et al. |
| 6,199,762 B1 | 3/2001 | Hohle |
| 6,219,639 B1 | 4/2001 | Bakis et al. |
| 6,223,984 B1 | 5/2001 | Renner et al. |
| 6,233,348 B1 | 5/2001 | Fujii et al. |
| 6,256,690 B1 | 7/2001 | Carper |
| 6,257,486 B1 | 7/2001 | Teicher et al. |
| 6,257,620 B1 | 7/2001 | Kenney |
| 6,263,446 B1 | 7/2001 | Kausik et al. |
| 6,265,977 B1 | 7/2001 | Vega et al. |
| 6,268,788 B1 | 7/2001 | Gray |
| 6,269,348 B1 | 7/2001 | Pare, Jr. et al. |
| 6,270,011 B1 | 8/2001 | Gottfried |
| 6,272,562 B1 | 8/2001 | Scott et al. |
| 6,275,353 B1 | 8/2001 | Briggs |
| 6,282,649 B1 | 8/2001 | Lambert |
| 6,298,146 B1 | 10/2001 | Ilan et al. |
| 6,307,956 B1 | 10/2001 | Black |
| 6,325,285 B1 | 12/2001 | Baratelli |
| 6,327,578 B1 | 12/2001 | Linehan |
| 6,332,193 B1 | 12/2001 | Glass et al. |
| 6,338,048 B1 | 1/2002 | Mori |
| 6,338,435 B1 | 1/2002 | Carper |
| 6,345,761 B1 | 2/2002 | Seelbach et al. |
| 6,357,663 B1 | 3/2002 | Takahashi et al. |
| 6,360,953 B1 | 3/2002 | Lin et al. |
| 6,390,374 B1 | 5/2002 | Carper et al. |
| 6,424,249 B1 | 7/2002 | Houvener |
| 6,442,286 B1 | 8/2002 | Kramer |
| 6,446,862 B1 | 9/2002 | Mann |
| 6,480,825 B1 | 11/2002 | Sharma et al. |
| 6,480,935 B1 | 11/2002 | Carper et al. |
| 6,483,929 B1 | 11/2002 | Murakami et al. |
| 6,483,932 B1 | 11/2002 | Martinez et al. |
| 6,490,443 B1 | 12/2002 | Freeny, Jr. |
| 6,496,594 B1 | 12/2002 | Prokoski |
| 6,507,662 B1 | 1/2003 | Brooks |
| 6,519,565 B1 | 2/2003 | Clements et al. |
| 6,539,101 B1 | 3/2003 | Black |
| 6,560,581 B1 | 5/2003 | Fox et al. |
| 6,588,660 B1 | 7/2003 | Buescher et al. |
| 6,588,673 B1 | 7/2003 | Chan et al. |
| 6,591,249 B2 | 7/2003 | Zoka |
| 6,601,759 B2 | 8/2003 | Fife et al. |
| 6,601,762 B2 | 8/2003 | Piotrowski |
| 6,609,656 B1 | 8/2003 | Elledge |
| 6,615,191 B1 | 9/2003 | Seeley |
| 6,628,813 B2 | 9/2003 | Scott et al. |
| 6,629,591 B1 | 10/2003 | Griswold et al. |
| 6,631,201 B1 | 10/2003 | Dickinson et al. |
| 6,636,620 B1 | 10/2003 | Hoshino |
| 6,655,585 B2 | 12/2003 | Shinn |
| 6,657,614 B1 | 12/2003 | Ito et al. |
| 6,658,164 B1 | 12/2003 | Irving et al. |
| 6,662,166 B2 | 12/2003 | Pare, Jr. et al. |
| 6,669,086 B2 | 12/2003 | Abdi et al. |
| 6,681,328 B1 | 1/2004 | Harris et al. |
| 6,687,391 B1 | 2/2004 | Scott et al. |
| 6,697,947 B1 | 2/2004 | Matyas, Jr. et al. |
| 6,703,918 B1 | 3/2004 | Kita |

(56) References Cited

U.S. PATENT DOCUMENTS

| | | |
|---|---|---|
| 6,719,200 B1 | 4/2004 | Wiebe |
| 6,732,919 B2 | 5/2004 | Macklin et al. |
| 6,734,887 B2 | 5/2004 | Field |
| 6,744,909 B1 | 6/2004 | Kostrzewski et al. |
| 6,744,910 B1 | 6/2004 | McClurg et al. |
| 6,765,470 B2 | 7/2004 | Shinzaki |
| 6,776,332 B2 | 8/2004 | Allen et al. |
| 6,799,726 B2 | 10/2004 | Stockhammer |
| 6,816,058 B2 | 11/2004 | McGregor et al. |
| 6,819,219 B1 | 11/2004 | Bolle et al. |
| 6,826,000 B2 | 11/2004 | Lee et al. |
| 6,828,299 B2 | 12/2004 | Yang et al. |
| 6,828,960 B2 | 12/2004 | Parry |
| 6,834,795 B1 | 12/2004 | Rasmussen et al. |
| 6,867,850 B2 | 3/2005 | McClurg |
| 6,870,946 B1 | 3/2005 | Teng |
| 6,873,974 B1 | 3/2005 | Schutzer |
| 6,877,097 B2 | 4/2005 | Hamid et al. |
| 6,886,104 B1 | 4/2005 | McClurg et al. |
| 6,892,940 B2 | 5/2005 | Kocarev et al. |
| 6,901,154 B2 | 5/2005 | Dunn |
| 6,914,517 B2 | 7/2005 | Kinsella |
| 6,917,695 B2 | 7/2005 | Teng et al. |
| 6,925,439 B1 | 8/2005 | Pitroda |
| 6,925,565 B2 | 8/2005 | Black |
| 6,928,181 B2 | 8/2005 | Brooks |
| 6,928,195 B2 | 8/2005 | Scott et al. |
| 6,929,413 B2 | 8/2005 | Schofield |
| 6,931,538 B1 | 8/2005 | Sawaguchi |
| 6,934,861 B2 | 8/2005 | Haala |
| 6,944,768 B2 | 9/2005 | Siegel et al. |
| 6,954,260 B2 | 10/2005 | Arnold et al. |
| 6,968,453 B2 | 11/2005 | Doyle et al. |
| 6,970,582 B2 | 11/2005 | Langley |
| 6,971,031 B2 | 11/2005 | Haala |
| 6,983,062 B2 | 1/2006 | Smith |
| 6,988,665 B2 | 1/2006 | Schofield |
| 6,996,259 B2 | 2/2006 | Cannon et al. |
| 6,997,381 B2 | 2/2006 | Arnouse |
| 7,010,148 B2 | 3/2006 | Irving et al. |
| 7,028,893 B2 | 4/2006 | Goodman et al. |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,059,531 B2 | 6/2006 | Beenau et al. |
| 7,068,822 B2 | 6/2006 | Scott |
| 7,073,711 B2 | 7/2006 | Fernandez et al. |
| 7,079,007 B2 | 7/2006 | Siegel et al. |
| 7,095,880 B2 | 8/2006 | Martinez et al. |
| 7,102,523 B2 | 9/2006 | Shanks et al. |
| 7,103,201 B2 | 9/2006 | Scott et al. |
| 7,127,088 B1 | 10/2006 | Grajewski et al. |
| 7,132,946 B2 | 11/2006 | Waldner et al. |
| 7,155,039 B1 | 12/2006 | Lo |
| 7,162,060 B1 | 1/2007 | Barton et al. |
| 7,164,440 B2 | 1/2007 | Cannon |
| 7,165,716 B1 | 1/2007 | Mödl et al. |
| 7,171,662 B1 | 1/2007 | Misra et al. |
| 7,181,017 B1 | 2/2007 | Nagel et al. |
| 7,203,344 B2 | 4/2007 | McClurg et al. |
| 7,218,202 B2 | 5/2007 | Bacchiaz et al. |
| 7,239,227 B1 | 7/2007 | Gupta et al. |
| 7,266,848 B2 | 9/2007 | Moyer et al. |
| 7,271,881 B2 | 9/2007 | Arnold et al. |
| 7,278,025 B2 | 10/2007 | Saito et al. |
| 7,289,649 B1 | 10/2007 | Walley et al. |
| 7,303,120 B2 | 12/2007 | Beenau et al. |
| 7,305,563 B2 | 12/2007 | Bacchiaz et al. |
| 7,308,122 B2 | 12/2007 | McClurg et al. |
| 7,314,164 B2 | 1/2008 | Bonalle et al. |
| 7,314,165 B2 | 1/2008 | Bonalle et al. |
| 7,319,565 B2 | 1/2008 | Arnold et al. |
| 7,325,724 B2 | 2/2008 | Bonalle et al. |
| 7,364,071 B2 | 4/2008 | Esplin |
| 7,466,348 B2 | 12/2008 | Morikawa et al. |
| 7,506,172 B2 | 3/2009 | Bhakta |
| 7,543,337 B2 | 6/2009 | D'Agnolo |
| 7,724,137 B2 | 5/2010 | Page |
| 7,730,526 B2 | 6/2010 | Lamplough |
| 7,751,593 B2 | 7/2010 | Hombo |
| 7,938,329 B2 | 5/2011 | Tran |
| 7,946,501 B2 | 5/2011 | Borracci |
| 7,992,789 B2 | 8/2011 | Borracci |
| 8,045,956 B2 | 10/2011 | Sun |
| 8,095,519 B2 | 1/2012 | Delia |
| 8,186,580 B2 | 5/2012 | Cannon et al. |
| 8,253,531 B2 | 8/2012 | Davis et al. |
| 8,275,353 B2 | 9/2012 | Sun |
| 8,276,816 B2 | 10/2012 | Gardner |
| 8,307,207 B2 | 11/2012 | Bacchiaz et al. |
| 8,360,322 B2 | 1/2013 | Bonalle et al. |
| 8,485,442 B2 | 7/2013 | McNeal |
| 8,490,872 B2 | 7/2013 | Kim |
| 8,499,164 B2 | 7/2013 | Ortiz et al. |
| 8,553,251 B2 | 10/2013 | Iizuka |
| 8,572,395 B2 | 10/2013 | Ito |
| 8,598,981 B2 | 12/2013 | Idsøe et al. |
| 8,607,063 B2 | 12/2013 | Ikeuchi |
| 8,708,230 B2 | 4/2014 | Cannon et al. |
| 8,713,660 B2 | 4/2014 | Carper |
| 8,756,680 B2 | 6/2014 | Shashidhar |
| 8,782,427 B2 | 7/2014 | Fedronic et al. |
| 8,783,578 B2 | 7/2014 | Kim |
| 8,786,033 B2 | 7/2014 | Saito |
| 8,799,167 B2 | 8/2014 | Carper |
| 9,697,388 B1 | 7/2017 | Jacobson |
| 2001/0049785 A1 | 12/2001 | Kawan |
| 2002/0059523 A1 | 5/2002 | Bacchiaz et al. |
| 2002/0095587 A1 | 7/2002 | Doyle et al. |
| 2002/0153424 A1 | 10/2002 | Li |
| 2003/0046554 A1 | 3/2003 | Leydier |
| 2003/0159044 A1 | 8/2003 | Doyle |
| 2004/0039909 A1 | 2/2004 | Cheng |
| 2004/0129787 A1 | 7/2004 | Saito et al. |
| 2004/0188519 A1 | 9/2004 | Cassone |
| 2004/0266267 A1 | 12/2004 | Inaba |
| 2005/0035200 A1 | 2/2005 | Hendrick |
| 2005/0125674 A1 | 6/2005 | Nishiki |
| 2005/0139685 A1 | 6/2005 | Kozlay |
| 2005/0144354 A1 | 6/2005 | Murashita |
| 2005/0161503 A1 | 7/2005 | Remery |
| 2005/0182947 A1 | 8/2005 | Bacchiaz et al. |
| 2005/0240778 A1 | 10/2005 | Saito |
| 2006/0032905 A1 | 2/2006 | Bear |
| 2006/0070114 A1 | 3/2006 | Wood |
| 2006/0113381 A1 | 6/2006 | Hochstein et al. |
| 2006/0161789 A1 | 7/2006 | Doughty |
| 2006/0208066 A1 | 9/2006 | Finn |
| 2007/0033150 A1 | 2/2007 | Nwosu |
| 2007/0040017 A1 | 2/2007 | Kozlay |
| 2007/0043594 A1 | 2/2007 | Lavergne |
| 2007/0073619 A1 | 3/2007 | Smith |
| 2007/0124536 A1 | 5/2007 | Carper |
| 2007/0154018 A1 | 7/2007 | Watanabe |
| 2007/0186106 A1 | 8/2007 | Ting |
| 2007/0194131 A1 | 8/2007 | Brown |
| 2007/0220273 A1 | 9/2007 | Campisi |
| 2007/0228154 A1 | 10/2007 | Tran |
| 2007/0251997 A1 | 11/2007 | Brown |
| 2008/0005425 A1 | 1/2008 | Saito |
| 2008/0016370 A1 | 1/2008 | Libin |
| 2008/0019578 A1 | 1/2008 | Saito et al. |
| 2008/0040615 A1 | 2/2008 | Carper et al. |
| 2008/0054875 A1 | 3/2008 | Saito |
| 2008/0072065 A1 | 3/2008 | Bonalle et al. |
| 2008/0097924 A1 | 4/2008 | Carper et al. |
| 2008/0126260 A1 | 5/2008 | Cox |
| 2008/0148059 A1 | 6/2008 | Shapiro |
| 2008/0164325 A1 | 7/2008 | Borracci |
| 2008/0201658 A1 | 8/2008 | Saito et al. |
| 2008/0223921 A1 | 9/2008 | Salazar |
| 2008/0223925 A1 | 9/2008 | Saito et al. |
| 2008/0230613 A1 | 9/2008 | Leibenguth |
| 2008/0282334 A1 | 11/2008 | Yves |

(56) References Cited

U.S. PATENT DOCUMENTS

| | | |
|---|---|---|
| 2009/0084858 A1 | 4/2009 | Borracci |
| 2009/0094125 A1 | 4/2009 | Killian |
| 2009/0313493 A1 | 12/2009 | Ide |
| 2009/0322477 A1 | 12/2009 | Celorio |
| 2010/0039234 A1 | 2/2010 | Soliven et al. |
| 2010/0080425 A1 | 4/2010 | Bebis |
| 2010/0148312 A1 | 6/2010 | Jung |
| 2010/0153451 A1 | 6/2010 | Delia |
| 2010/0161488 A1 | 6/2010 | Evans |
| 2010/0215224 A1 | 8/2010 | Saito |
| 2010/0257359 A1 | 10/2010 | Currie |
| 2010/0260388 A1 | 10/2010 | Garrett |
| 2010/0275259 A1 | 10/2010 | Adams |
| 2011/0238540 A1 | 9/2011 | Carrington |
| 2011/0256832 A1 | 10/2011 | Park |
| 2012/0016798 A1 | 1/2012 | Carper |
| 2012/0022957 A1 | 1/2012 | Sun |
| 2012/0079273 A1 | 3/2012 | Bacchiaz et al. |
| 2012/0120013 A1 | 5/2012 | Kurz |
| 2012/0218079 A1 | 8/2012 | Kim |
| 2012/0241524 A1 | 9/2012 | Blot et al. |
| 2012/0297467 A1 | 11/2012 | Carper |
| 2012/0313754 A1 | 12/2012 | Bona |
| 2013/0026230 A1 | 1/2013 | Cannon et al. |
| 2013/0036463 A1 | 2/2013 | Shashidhar |
| 2013/0056540 A1 | 3/2013 | Blot et al. |
| 2013/0080788 A1 | 3/2013 | Bacchiaz et al. |
| 2013/0290136 A1 | 10/2013 | Sheets |
| 2014/0006277 A1 | 1/2014 | Rao |
| 2014/0046785 A1 | 2/2014 | Jenkins |
| 2014/0232526 A1 | 8/2014 | Carper |
| 2014/0251997 A1 | 9/2014 | Bitton |
| 2015/0067348 A1 | 3/2015 | Webber |
| 2015/0127553 A1 | 5/2015 | Sundaram |
| 2015/0262170 A1 | 9/2015 | Bouda |
| 2015/0379033 A1 | 12/2015 | Agarwal |
| 2016/0191512 A1 | 6/2016 | Tatourian |
| 2017/0170513 A1 | 6/2017 | Sakamoto |
| 2017/0323130 A1 | 11/2017 | Dickinson |

FOREIGN PATENT DOCUMENTS

| | | |
|---|---|---|
| AU | 2003274967 A1 | 4/2004 |
| AU | 2004218720 B2 | 11/2004 |
| AU | 784438 B2 | 4/2006 |
| AU | 2006311596 A1 | 5/2007 |
| AU | 2007229728 A1 | 10/2007 |
| AU | 2010224455 A1 | 1/2011 |
| CA | 2346592 A1 | 11/2001 |
| CA | 2498288 A1 | 3/2004 |
| CA | 2564707 A1 | 11/2005 |
| CA | 2629435 A1 | 5/2007 |
| CA | 2748563 A1 | 3/2012 |
| CA | 2844003 A1 | 2/2013 |
| DE | 60111892 T2 | 8/2005 |
| DE | 10393215 T5 | 9/2005 |
| EP | 994439 A2 | 4/2000 |
| EP | 1256908 A1 | 11/2002 |
| EP | 1418486 | 5/2004 |
| EP | 1537526 | 6/2005 |
| EP | 1157906 A2 | 7/2005 |
| EP | 1647942 A2 | 4/2006 |
| EP | 1716660 | 11/2006 |
| EP | 1759337 | 3/2007 |
| EP | 1840788 | 10/2007 |
| EP | 1924976 | 5/2008 |
| EP | 1952244 | 8/2008 |
| EP | 2290625 A1 | 3/2011 |
| EP | 2434462 A1 | 3/2012 |
| EP | 2569735 B1 | 3/2013 |
| FR | 2953619 A1 | 6/2011 |
| FR | 2959847 A1 | 11/2011 |
| GB | 2473283 A | 3/2011 |
| JP | 02088859 | 3/1990 |
| JP | H0288859 | 3/1990 |
| JP | 02118790 A | 5/1990 |
| JP | 11039483 A | 2/1999 |
| JP | 2001250064 | 9/2001 |
| JP | 2001323691 A | 11/2001 |
| JP | 2002183706 | 6/2002 |
| JP | 2005242650 | 9/2005 |
| JP | 2005326995 | 11/2005 |
| JP | 2006257871 A | 9/2006 |
| JP | 200748118 | 2/2007 |
| JP | 2007048118 | 2/2007 |
| JP | 2007058649 | 3/2007 |
| JP | 2007156785 | 6/2007 |
| JP | 2007265321 | 10/2007 |
| JP | 2008078820 A | 4/2008 |
| JP | 2010262586 | 11/2010 |
| JP | 2011090686 A | 5/2011 |
| JP | 2012074011 A | 4/2012 |
| JP | 2014134845 | 7/2014 |
| KR | 20030042639 | 6/2003 |
| WO | 9718653 | 5/1997 |
| WO | 2001016707 a1 | 3/2001 |
| WO | 2001016759 A1 | 3/2001 |
| WO | 2001016865 A1 | 3/2001 |
| WO | 2001016873 A1 | 3/2001 |
| WO | 2001016874 A1 | 3/2001 |
| WO | 2001039427 A1 | 3/2001 |
| WO | 2004025545 A2 | 3/2004 |
| WO | 2005104704 A1 | 11/2005 |
| WO | 2006102625 A2 | 9/2006 |
| WO | 2007022423 A2 | 2/2007 |
| WO | 2007056476 A2 | 5/2007 |
| WO | 2007064429 A1 | 6/2007 |
| WO | 2007143670 A2 | 12/2007 |
| WO | 2007146681 A2 | 12/2007 |
| WO | 2008010899 A2 | 1/2008 |
| WO | 2008079491 A2 | 7/2008 |
| WO | 2010019961 A2 | 2/2010 |
| WO | 2010077999 A2 | 7/2010 |
| WO | 2010133469 | 11/2010 |
| WO | 2010133496 | 11/2010 |
| WO | 2011067543 A1 | 6/2011 |
| WO | 2011141659 A2 | 11/2011 |

OTHER PUBLICATIONS

John Fenske, "Biometrics Move to Smart Cards and Smartphones for Access Control", John Fenske, Jul. 30, 2013.*
Patent Cooperation Treaty, International Search Report for PCT/IB2016/000026, dated May 17, 2016, pp. 4-5.
Patent Cooperation Treaty, International Search Report for PCT/US2016/000020, dated May 24, 2016, pp. 4-5.
Patent Cooperation Treaty, International Search Report for PCT/IB2016/000048, dated Apr. 15, 2016, p. 5.
Patent Cooperation Treaty, International Search Report for PCT/IB2016/000324, dated Oct. 18, 2016, pp. 4-5.
Patent Cooperation Treaty, International Preliminary Report on Patentability PCT/IB2016/000020, dated Jul. 18, 2017, p. 4.
Patent Cooperation Treaty, International Preliminary Report on Patentability for PCT/IB2016/000048, dated Apr. 26, 2016, p. 4.
Patent Cooperation Treaty, International Search Report for PCT/IB2016/00093, dated Sep. 5, 2017, p. 7.
Patent Cooperation Treaty, International Preliminary Report on Patentability for PCT/IB2016/000093, dated Sep. 26, 2017, p. 4.
Patent Cooperation Treaty, International Preliminary Report on Patentability for PCT/IB2016/000026, dated Jul. 18, 2017, p. 4.
Patent Cooperation Treaty, International Preliminary Report on Patentability for PCT/IB2016/000324, dated Sep. 26, 2017, p. 4.
Patent Cooperation Treaty, International Preliminary Report on Patentability for PCT/IB2016/000048, dated Jul. 25, 2017, p. 4.
Patent Cooperation Treaty, International Search Report for PCT/IB2016/00020, dated May 24, 2017, pp. 2-3.
Jung, Stefan, "A Low-Power and High-Performance CMOS Fingerprint Sensing and Encoding Architecture," IEEE Journal of Solid-State Circuits, Jul. 1999, pp. 978-984, vol. 34, No. 7.
Noore, Afzel, "Highly Robust Biometric Smart Card Design," IEEE Transactions on Consumer Electronics, Nov. 2000, pp. 1059-1063, vol. 46, No. 4.

(56) References Cited

OTHER PUBLICATIONS

Sanchez-Reillo, Raul, et al., "Fingerprint Verification Using Smart Cards for Access Control Systems," 2001, pp. 250-253.

Sanchez-Reillo, Raul, et al., "Microprocessor Smart Cards with Fingerprint User Authorization," IEEE AESS Systems Magazine, Mar. 2003, pp. 22-24.

Sung, Bum Pan, et al., "An Ultra-Low Memory Fingerprint Matching Algorithm and Its Implementation on a 32-bit Smart Card," IEEE, Mar. 26, 2003, pp. 453-459.

Kim, Dong-Sun, "On the Design of an Embedded Biometric Smart Card Reader," IEEE, Apr. 16, 2008, pp. 573-577.

Kim, Seong-Jin, "A CMOS Fingerprint System-on-a-Chip With Adaptable Pixel Networks and Column-Parallel Processors for Image Enhancement and Recognition," IEEE Journal of Solid-State Circuits, Nov. 2008, pp. 2558-2567, vol. 43, No. 11.

Nixon, Jenny, "Reconciling your Quicken Account with the Bank Statement," University of Nebraska, Lincoln, 2005.

"Biometric Technology for Secure Access," Sep. 18, 2007, Biometric Associates, Inc., Baltimore, MD, USA.

Anonymous: "ISO/IEC 7816-3 Identification cards—Integrated circuit cards—Part 3: Cards with contacts—Electrical interface and transmission protocols", Nov. 1, 2006 (Nov. 1, 2006), XP055438640, Retrieved from the Internet: URL:http://read.pudn.com/downloads132/doc/comm/563504/ISO-IEC 7816/ISO+IEC7816-3-2006.pdf [retrieved on Jan. 8, 2018].

\* cited by examiner

SMART CARD SYSTEMS AND METHODS UTILIZING MULTIPLE ATR MESSAGES

CROSS-REFERENCE TO RELATED APPLICATIONS

The present application is related to co-pending U.S. patent application Ser. No. 14/596,508, filed Jan. 14, 2015, entitled "System and Method for Requesting Reconciliation of Electronic Transaction Records for Enhanced Security"; U.S. patent application Ser. No. 14/596,472, filed Jan. 14, 2015, entitled "System and Method for Comparing Electronic Transaction Records for Enhanced Security"; U.S. patent application Ser. No. 14/596,420, filed Jan. 14, 2015, entitled "System and Method for Reconciling Electronic Transaction Records for Enhanced Security"; and U.S. patent application Ser. No. 14/596,572, filed Jan. 14, 2015, entitled "Smart Card Systems Comprising a Card and a Carrier"; U.S. patent application Ser. No. 14/603,703, filed Jan. 23, 2015, entitled "Biometric Device Utilizing Finger Sequence for Authentication," the disclosures of which are incorporated herein by reference.

FIELD OF THE INVENTION

The present disclosure relates generally to smart cards, and more particularly, smart card systems and methods utilizing multiple Answer to Reset (ATR) messages.

BACKGROUND

Electronic transactions, such as credit card transactions, can be conducted using smart cards. A smart card is a device that includes an embedded integrated circuit chip that can be either a secure processing module (e.g., microprocessor, microcontroller or equivalent intelligence) with an internal or external memory or a memory chip alone. The smart card can be connected to a reader via direct physical contact or via a contactless (e.g., RF) interface. Smart cards come in many different form factors, including plastic cards, fobs, SIM cards used in mobile phones, and USB tokens. Smart cards can provide identification, authentication, data storage, and application processing, as well as serving as credit or ATM debit cards, phone or fuel cards, and high-security access-control cards for granting access to a building or computer.

Some smart cards and the corresponding reader terminals conform to international standards such as ISO 7816 and ISO 14443 that specify physical characteristics and various communication and security protocols. In the ISO 7816 standard, for example, communication between a reader (master) and a smart card (slave) takes place over a single bi-directional, half-duplex data line. Parameters such as protocol format, type of smart card, baud rate and other electrical parameters are read out of the smart card right after reset. This is known as the Answer to Reset, or ATR. Based on the information given in the ATR, the reader can adapt to the transmission format supported by the card. Similar messages are utilized in the early communication between ISO 14443 compliant terminals and smart cards.

When a smart card is inserted into the reader, all the contacts are disconnected from the reader, including ground. The reason for this is that the contacts in the terminal slide over the smart card contacts while the card is inserted. Applying power to the wrong pins could in theory damage the card or the reader. When the card is properly inserted, there is usually an electrical contact that breaks connection, indicating to the reader that the card is fully inserted. Once inserted, the reader initiates a power on and reset sequence. The interface is responsible for the timing of the sequence. A conventional ISO smart card startup process is illustrated in the timing diagram of FIG. 8. The most important parameters are the clock cycle count before and after reset is released. The interface enables the clock and keeps it running for a predetermined number of clock cycles (typically 40,000) before reset is released. After reset, the smart card must respond with its ATR message within a window of a predetermined number of clock cycles, (typically 40000). If an ATR is not received from the smart card within the window, all the contacts are disconnected from the reader, thereby effectively disconnecting the smart card from the terminal/reader.

The conventional startup and transaction process utilizing a single ATR message illustrated in FIG. 8 presents a problem when the smart card is a biometric smart card. This is because it is not possible to perform a biometric authentication procedure including, for example, reading of a user's fingerprint, preparation of a fingerprint template, and comparison of the prepared fingerprint template to a stored reference fingerprint template of an authorized user, within the allowed window of predetermined clock cycles. Therefore, conventional startup and transmission schemes utilizing a single ATR message do not permit a biometric authentication in ISO-compliant smart cards.

BRIEF SUMMARY OF THE INVENTION

According to various embodiments of the disclosed technology, a method of facilitating communication between a smart card and a terminal is provided, comprising receiving a first ATR message at a first time that is within a first predetermined clock cycles after a reset; waiting for a second ATR message indicative of a successful biometric authentication from the smart card; receiving a second ATR message at a second time that is within a second predetermined clock cycles after the first time; and exchanging transaction-related messages with the smart card.

According to various embodiments of the disclosed technology, a method of facilitating communication between a smart card and a terminal is provided, comprising sending a first answer-to-reset (ATR) message at a first time that is within a first predetermined clock cycles after a reset; performing a biometric authentication of a user requesting a transaction involving the smart card; determining that the biometric authentication was successful; sending a second ATR message to the terminal at a second time that is within a second predetermined clock cycles after the first time; and exchanging transaction-related message with the terminal.

According to various embodiments of the disclosed technology, a terminal for communicating with a smart card is provided, comprising an interface configured to be coupled to a smart card; a processor coupled to the interface and configured to: wait for a first answer-to-reset (ATR) message from the smart card after a reset; receive the first ATR message via the interface at a first time that is within a first predetermined clock cycles after the reset; wait for a second ATR message indicative of a successful biometric authentication from the smart card; receive the second ATR message via the interface at a second time that is within a second predetermined clock cycles after the first time; and exchange transaction-related messages with the smart card via the interface.

According to various embodiments of the disclosed technology, a smart card is provided, comprising an interface configured to be coupled to a terminal; a biometric module coupled to the processor and configured to obtain a biometric signature of a user requesting a transaction; and a processor coupled to the interface and the biometric module and configured to: send a first answer-to-reset (ATR) message to the terminal via the interface at a first time that is within a first predetermined clock cycles after a reset; send a second ATR message indicative of a successful biometric authentication to the terminal via the interface at a second time that is within a second predetermined clock cycles after the first time; and exchange transaction-related messages with the terminal via the interface.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF SEVERAL VIEWS OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the technology disclosed herein are directed toward a system for and method of facilitating communication between a biometric smart card and a terminal (e.g., a smart card reader). More particularly, the various embodiments of the technology disclosed herein relate to smart card systems and methods utilizing multiple ATR messages.

In the following detailed description, numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1:
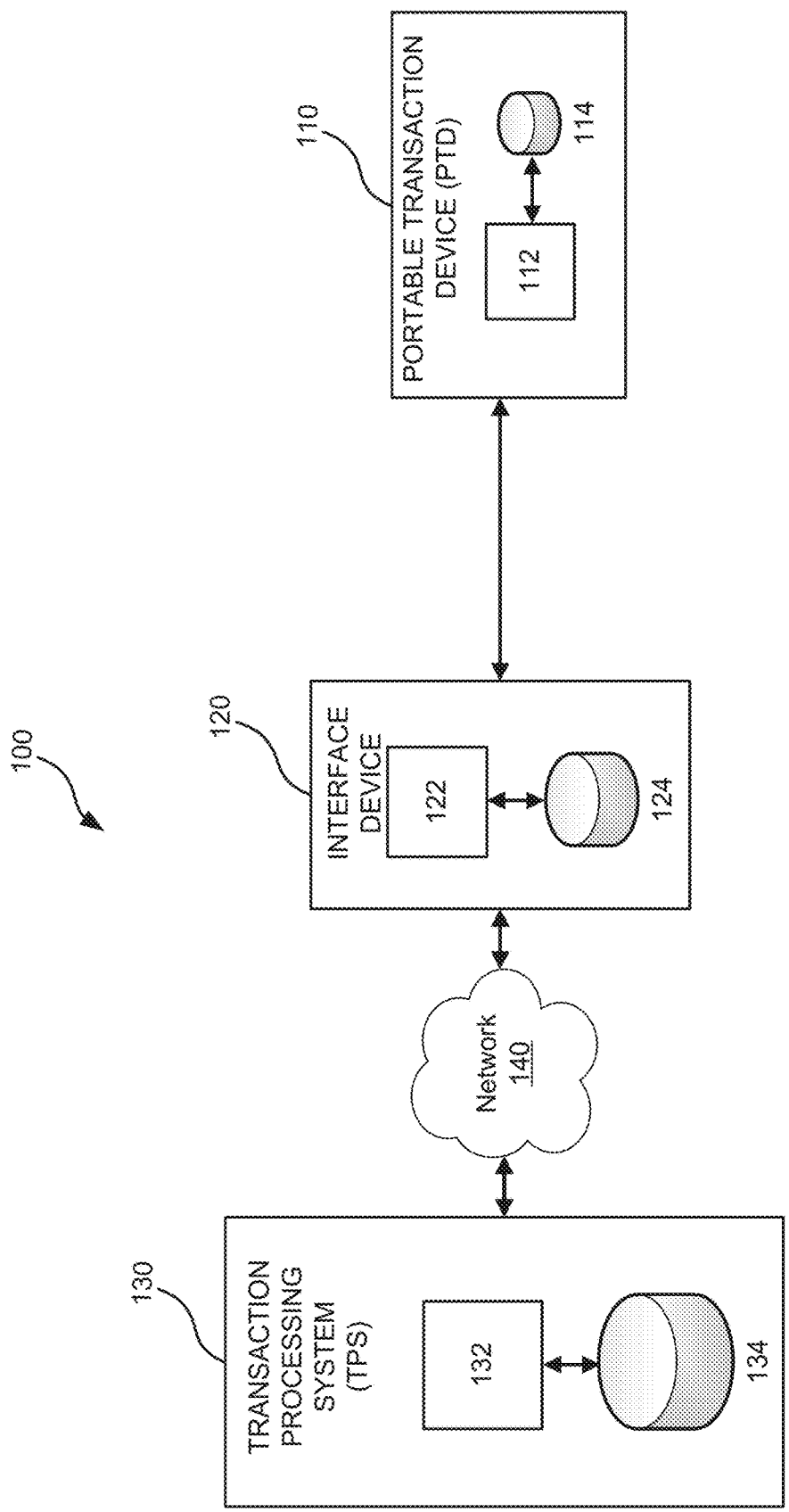
FIG. 1 is an example environment within which various embodiments of the technology disclosed herein may be implemented.

Before describing the technology disclosed in detail, it is useful to describe an example environment within which the technology can be implemented. FIG. 1 is a block diagram of an example electronic transaction system 100 that can implement a multiple ATR protocol according to certain aspects of the present disclosure. The system 100 includes an electronic portable transaction device (PTD) 110, a transaction processing system (TPS) 130, and an interface device 120 that facilitates communications between the PTD 110 and the TPS 130. The PTD 110 can be, for example, a smart card, a smart key, a smart fob, or a mobile device. In some embodiments, the PTD 110 can include a biometric authentication module (not shown) for biometric authentication, as discussed in more detail with regards to FIG. 2.

The PTD 110 can conduct various types of electronic transactions with the TPS 130 via the interface device 120. For financial transaction applications, the PTD 110 can be a smart payment card such as a smart credit, debit, and/or prepaid card, or a smartphone with a payment transaction application. The TPS 130 can be a payment processing system of a merchant (e.g., Target®), a bank (e.g., Bank of America®), or a card issuer (e.g., Visa®). The interface device 120 can be a point of sale (POS) terminal that can communicate with the PTD 110 using a contact method (e.g., matching male and female contact pads) or a contactless method (e.g., RFID, Bluetooth, NFC, Wi-Fi, ZigBee).

In some embodiments, the PTD 110 may communicate directly with the TPS 130 without an interface such as the interface device 120. For example, the PTD 110 can be equipped with a transceiver that can communicate with a cellular network such as a 3G UMTS or 4G LTE network. In some embodiments, the PTD 110 can be a smart phone capable of communicating with a cellular network.

For access control applications, the PTD 110 can be a smart access card, smart fob, or smart key for providing access to a facility or computer. For example, a PTD 110 in accordance with the present disclosure may be required to gain access to one or more of a secured facility, specific areas within a facility, a particular computing device or piece of equipment, a computer network, or a combination thereof. The TPS 130 can be a server in a central computer system, or a dedicated access controller that controls access to a facility or computer. Interface device 120 can be a card, fob, or key reader that can communicate with the PTD 110 using a contact method (e.g., contact pads) or a contactless method (e.g., RFID, Bluetooth, NFC, Wi-Fi, ZigBee).

In various embodiments, interface 120 may communicate with TPS 130 over network 140. Network 140 may be any communications network, such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 140 may employ various communication media, such as a coaxial cable, fiber optic cable system, Ethernet, radio waves, etc.

In the illustrated example of FIG. 1, the PTD 110 includes a processing module 112 and a data storage device 114; the interface device 120 includes a processing module 122 and a data storage device 124; and the TPS 130 includes a processing module 132 and a data storage device 134. In some embodiments, the PTD 110 can include a biometric authentication module (not shown) that includes a biometric sensor and a controller. The processing modules 112, 122, and 132, depending on the application, may be a microprocessor, microcontroller, application-specific integrated circuit (ASIC), field-programmable gate array (FPGA), computer, server, or any combination of components or devices configured to perform and/or control the functions of the PTD 110, interface device 120, and TPS 130, respectively. The data storage devices 114, 124, and 134, depending on the application, may be a read-only memory (ROM), such as EPROM or EEPROM, flash, a hard disk, a database, or any other storage component capable of storing executory programs and information for use by the processing modules 112, 122, and 132, respectively. Although PTD 110, interface device 120, and TPS 130 are all shown including a processing module (112, 122, 132) and a data storage device (114, 124, 134), such components are not required in all embodiments. In various embodiments, only one data storage device or only one processing module may be present that is accessible by one or more of the PTD, the interface device, and the TPS.

There are many examples of biometric devices with which the present disclosure can be implemented. One example is the biometric smart card illustrated in FIG. 2. In various embodiments, smart card 200 has substantially the same shape and form factor as conventional credit and debit cards. Smart card 200 comprises a processing module 212 and a memory 214. Processing module 212 may be a microprocessor, microcontroller, application-specific integrated circuit (ASIC), field-programmable gate array (FPGA), or any combination of components configured to perform and/or control the functions of smart card 200. Memory 214 may be a read-only memory (ROM) such as EPROM or EEPROM, flash, or any other storage component capable of storing executory programs and information for use by the processing module 212. Memory 214 can be internal to processor 212.

Smart card 200 includes a transaction interface 216. Transaction interface 216 is communicatively coupled to processing module 212. In various embodiments, transaction interface 216 is configured to communicate with TPS 130 through interface device 120 described above with respect to FIG. 1. Interface device 120 may be any point-of-sale (POS) or other transaction terminal connected to TPS 130 and configured to enable transactions with smart card 200 to occur. In various embodiments, transaction interface 216 may include one or more conductive pads or pins that make electrical contact with corresponding conductive pads or pins provided in interface device 120. Data communication between smart card 200 and interface device 120 occurs through transaction interface 216. In various embodiments, when smart card 200 is engaged with interface device 120 for a transaction, some of the conductive pads of transaction interface 216 provide paths by which electrical power flows from interface device 120 to the components of smart card 200 via power line 218. This eliminates the need for smart card 200 to have its own on-board power source, simplifying design and manufacture.

In other embodiments, smart card 200 may include additional components to allow direct communication with TPS 130 without the need of interface device 120. Smart card 200 may include components required to allow RFID, Bluetooth, NFC, Wi-Fi, or ZigBee communication with TPS 130.

Figure 2:
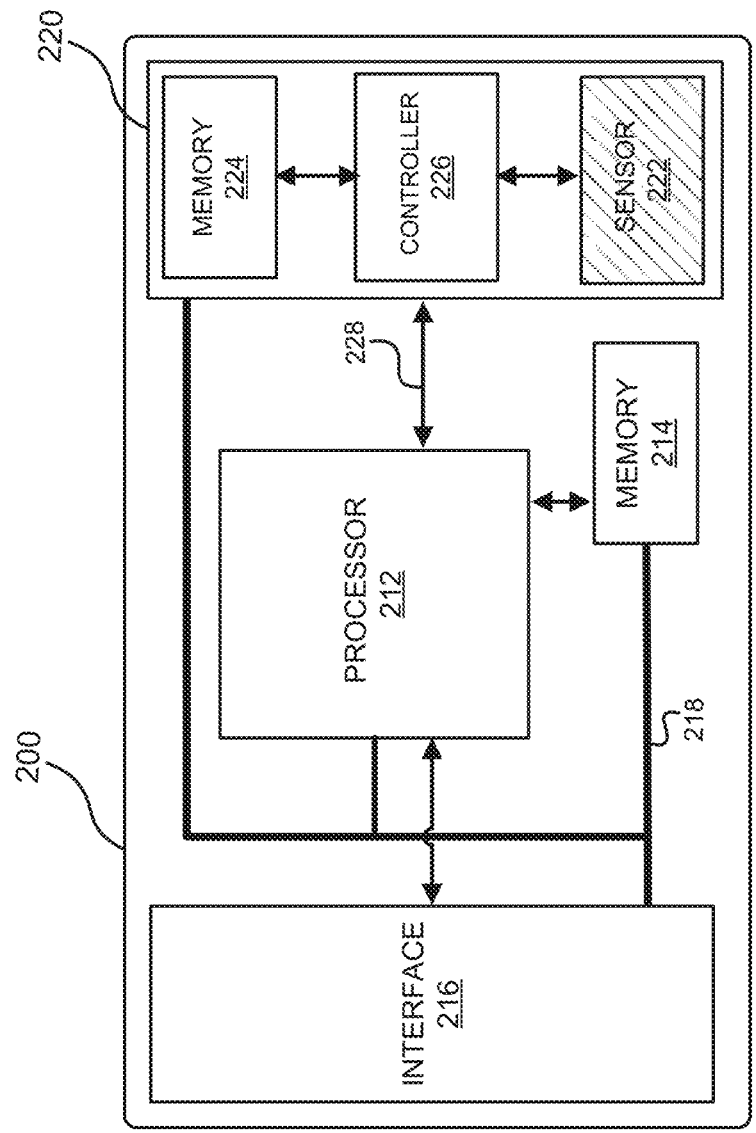
FIG. 2 is an example diagram of a personal transaction device that may be used in accordance with various embodiments of the technology disclosed herein.

As shown in FIG. 2, smart card 200 further includes a biometric authentication module 220. In various embodiments, biometric authentication module 220 includes an authentication memory 224, a controller module 226, and a biometric sensor 222. Authentication memory 224 may be configured to store a template of a biometric signature of an authorized (e.g., registered) user for authentication purposes. A biometric signature is a human characteristic unique to an individual, such as a fingerprint, voice, iris, or other physiological characteristic of the authorized user. The authentication process is described in more detail below. Authentication memory 224 may be a read-only memory (ROM) such as EPROM or EEPROM, flash, or any other storage component capable of storing biometric data of one or more authorized users at the time smart card 200 is issued. In various embodiments, authentication memory 224 may be capable of both read and write commands to allow for the addition of other later authorized users through a reenrollment process after issuance of the card. In various embodiments, authentication memory 224 and memory 214 may be the same component.

Controller 226 is a processing module configured to execute authentication application programming stored in memory 224. For ease of discussion, the controller 226 and the rest of the disclosure will describe the technology in regards to biometric authentication utilizing fingerprint images. Although described as such, the technology disclosed herein is applicable for any biometric authentication process, including authentication based on a user's iris scan, voice recognition, DNA sampling, or other biometric signature. The description should not be interpreted to limit the scope of the technology disclosed to any particular biometric authentication process.

In various embodiments, controller 226 may accept a fingerprint image input from scanner 222 and perform additional processing (e.g., extracting, focusing, aligning, rotating, scaling, normalizing, filtering and/or formatting) operations on the image to generate a fingerprint template that can be compared to a stored fingerprint template associated with an authorized (e.g., registered) user. In other embodiments, controller 226 can receive an already processed fingerprint template from scanner 222. Controller 226 is coupled to processing module 212 through connection 228. In various embodiments, controller 226 may be a separate hardware processing module from processing module 212. In various embodiments, controller 226 may be implemented in software, such as a virtual machine (VM) executed using processing module 212. In such an embodiment, additional security features may be implemented within processing module 212, such as partitioning between the VM and the card operating system to ensure that no unauthorized access to the controller module occurs. In various embodiments, the authentication application programming executed by controller 226 may be stored in memory 214 and accessible by controller 226 through processing module 212. In various embodiments, controller 226 may have direct access to memory 214.

Biometric sensor 222 is a biometric reader or scanner capable of reading or scanning a user's fingerprints. As discussed above, the biometric input from scanner 222 can be sent directly to controller 226 in order to allow controller 226 to perform formatting operations to generate a fingerprint template. In various embodiments, scanner 222 may be capable of formatting the fingerprint image prior to sending the fingerprint image to controller 226. As discussed above, the biometric authentication process may utilize any biometric signature unique to the user. Accordingly, in embodiments utilizing a different biometric signature for authentication, the biometric sensor 222 may be a sensor other than a fingerprint scanner, such as an iris scanner, a microphone, a blood collector, scent sensor, or other biometric-recording module.

Other biometric devices with which the present disclosure may be implemented include smart fobs, smart keys, and mobile devices, among others. For ease of discussion, the authentication process and embodiments thereof are discussed with regards to the biometric-enabled smart card shown in FIG. 2. This discussion should not be read to limit the embodiments to only transactions involving smart cards, as the present disclosure is compatible with any biometric device.

To biometrically authenticate the identity of a person requesting a new transaction involving the biometric smart card 200 utilizing fingerprint authentication, a processor in the smart card 200 can perform a comparison and a matching of one or more fingerprint templates associated with the person (the templates generated from fingerprint images received from biometric sensor 222) to one or more fingerprint templates associated with a registered user stored in a memory (e.g., memory 224 or memory 214). In some embodiments, the controller 226 performs both the generation of fingerprint templates associated with the person and the comparison and matching of the fingerprint templates to the stored fingerprint templates associated with the registered user. In other embodiments, the controller 226 performs the generation of fingerprint templates associated with the person and the processing module 212 performs the comparison and matching of the fingerprint templates to the stored fingerprint templates associated with the registered user.

In various embodiments, smart card 200 may have only a single component for processing both the transaction and authentication functions of smart card 200. In various embodiments, this single processing component may be processing module 212, and processing module 212 may be configured to execute both transaction applications and the functions of controller 226 described above. This eliminates the need for multiple processing units on the card and lowers the complexity of the design. In those embodiments employing a single processing component, the single processing component performs the generation of fingerprint templates associated with a person requesting a new transaction and the comparison and matching of the fingerprint templates to stored fingerprint templates associated with a registered user.

Figure 3:
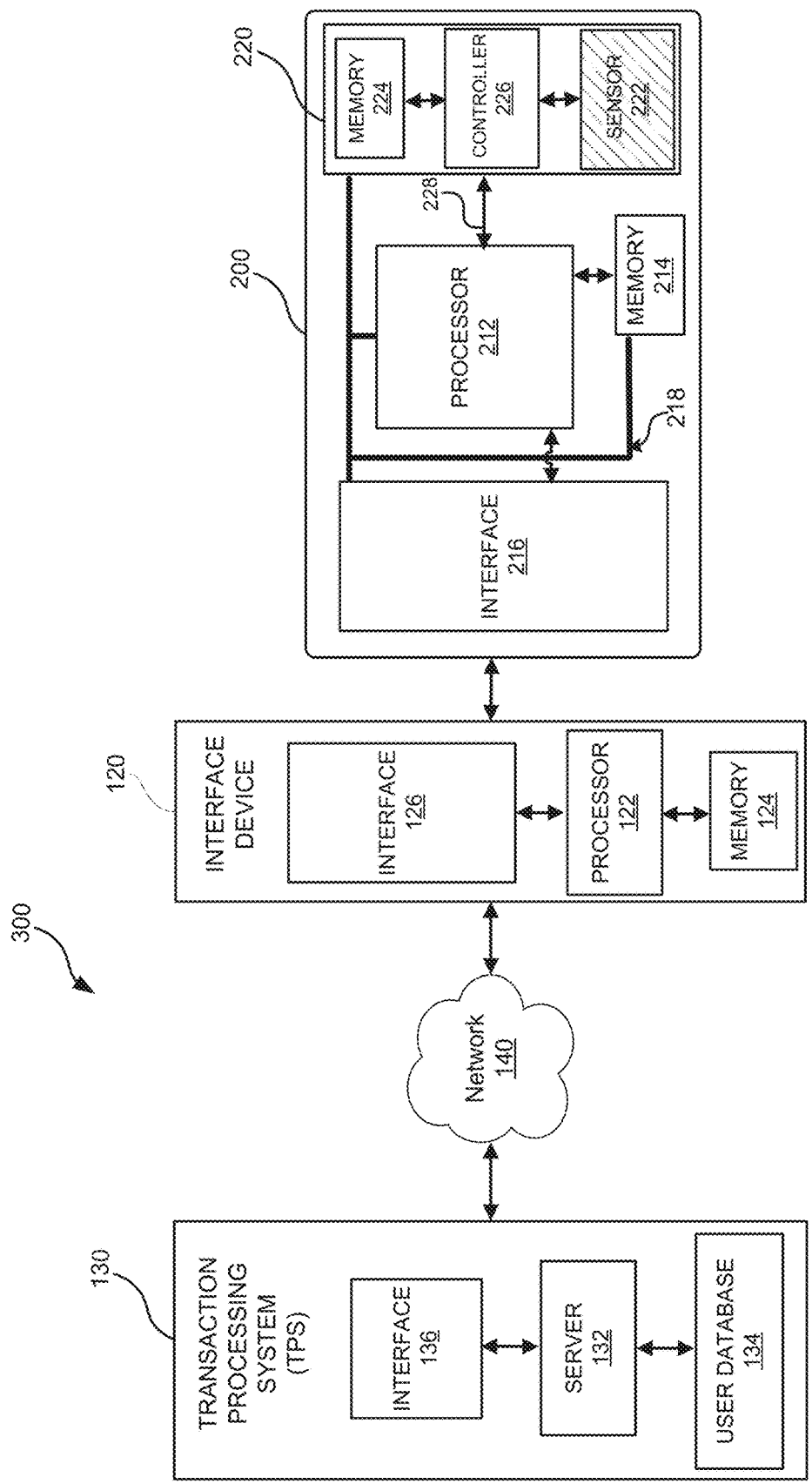
FIG. 3 is an example diagram of a transaction using a personal transaction device in accordance with the technology disclosed herein.

FIG. 3 illustrates an example transaction system 300 implementing smart card 200. In the illustrated example, the system 300 includes interface device 120 and TPS 130, described above with regards to FIG. 1. Also illustrated is smart card 200, which corresponds with the PTD 110 of FIG. 1. Although described in terms of smart card 200, the description should not be read to limit the present disclosure. In other embodiments, other PTDs may be used, such as a mobile device, a smart key, a smart fob, or a combination thereof. As illustrated in FIG. 3, interface device 120 includes a PTD interface 126, a processing module 122, and a data storage device 124. TPS 130 includes a processing module 132, and a data storage device 134, and a network interface 136 for communicating with interface device 120 via a communication network 140.

PTD interface 126 and transaction interface 216 on smart card 200 provide a communication link between smart card 200 and interface device 120. Using this communication link, smart card 200 can communicate authentication- and/or transaction-related data with interface device 120 and/or TPS 130. In various embodiments, interface device 120 may be a terminal and PTD interface 126 may be a physical card reader or scanner. In such embodiments, card 200 interacts with interface device 120 by inserting smart card 200 into the card reader, or scanning transaction interface 216 of smart card 200 with the card scanner of interface device 120. In other embodiments, smart card 200 may include components necessary to enable contactless transactions, such as transceivers required for RFID, Bluetooth, NFC, or ZigBee communication. In various embodiments, interface device 120 supplies power to smart card 200 through this physical connection. In other embodiments, card 200 may include on on-board power source to supply power to the card components. In still other embodiments, smart card 200 may include wires or coils configured to receive power through induction principles, such as induction through NFC. For ease of discussion, smart card 200 was used in descripting transaction system 300. This use, however, should not be read to limit the scope of the present disclosure. Transaction system 300 may be implemented in the same fashion using any PTD 110.

Figure 4:
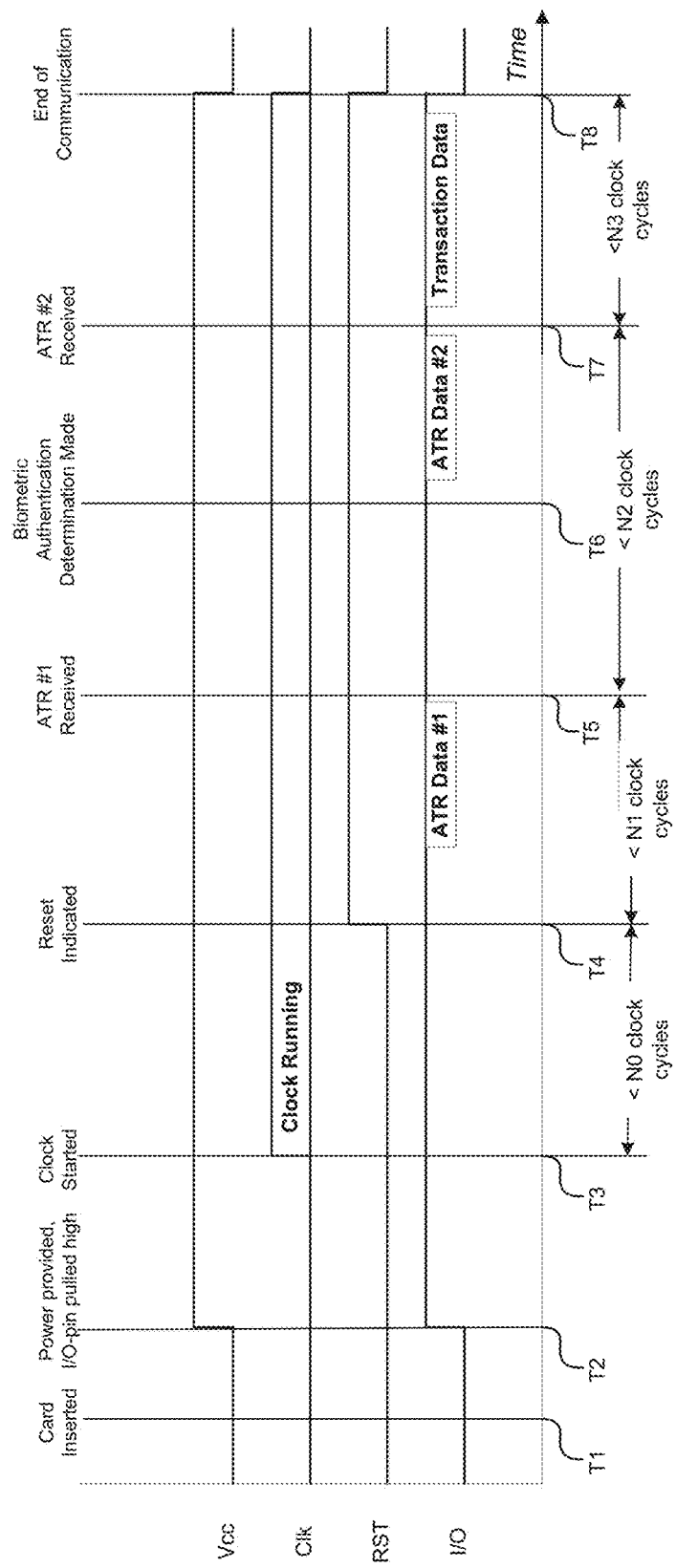
FIG. 4 is signal timing diagram illustrating an example startup and transaction process in accordance with the technology disclosed herein.

FIG. 4 is a signal timing diagram illustrating an example startup and transaction process between a biometric smart card and a terminal in accordance with the present disclosure. Although discussed in regards to the transaction environment illustrated in FIG. 3, implementation of the process of the present disclosure should not be limited to the transaction environment of FIG. 3. As one of ordinary skill in the art would recognize, the startup and transaction process is applicable in any transaction environment in which a smart card system employing an ATR process is implemented as a security layer. For ease of discussion, the timing diagram of FIG. 4 is described in relation to a transaction occurring between a biometric smart card and a terminal. Where appropriate, different embodiments may be discussed.

At t=T1, a biometric smart card 200 is inserted into a terminal 120 through a connection made between the interface 126 at the terminal 120 and the interface 216 at the smart card 200. In various embodiments, the interfaces 126 and 216 comprise a pair of matching (e.g., male and female) contact pads. The contact pads can include a pair of matching Input or Output (I/O) pads for exchanging (i.e., transmitting and receiving) various messages between the interface and the smart card. In some embodiments, the messages are exchanged through an I/O pad in a serial fashion during either a transmission mode or a reception mode. The contact pads can also include a pair of matching pads for transmitting a reset (RST) signal from the terminal 120 to the smart card 200. The contact pads can also include a pair of matching pads for providing power from the terminal 120 to the smart card 200.

At t=T2, power is provided to the smart card 200 by applying a voltage Vcc to the power pads. In the illustrated example, the I/O pads are also made ready by having them pulled high. At t=T3, a clock (CLK) is started. Subsequent timing windows, including the arrivals of ATR messages, are measured in terms of clock cycles associated with the clock. At t=T4, a reset (RST) signal is indicated within an initial number of clock cycles (N0) after the clock is started at T3.

In the illustrated embodiment, the RST signal is indicated by having the RST signal transition from low to high. In certain embodiments, the RST signal is provided from the terminal 120 to the smart card 200 via a reset pad. In other embodiments, the RST signal is internally generated at the smart card 200.

At t=T5, a first answer-to-reset (ATR) message is transmitted from the smart card 200 to the terminal 120 via the I/O pads within a first predetermined number (N1) of cycles after the reset is indicated at T4. In various embodiments, the first ATR message can include one or more data items (indicated as ATR data #1) indicative of protocol format, type of smart card, and/or baud rate. For contactless transactions, the smart card 200 may transmit an answer-to-select (ATS) or other message indicative of a request by a contactless smart card to conduct a transaction. The compliant terminal would then construct the ATR message based on the ATS or other message transmitted by the contactless smart card 200.

After transmission of the first ATR message at t=T4, a user requesting the transaction involving the smart card 200 is asked to input a biometric signature by, for example, presenting a finger or an iris on a biometric scanner. The biometric scanner can be part of the smart card 200 or the terminal 120. At t=T6, a biometric authentication determination based on the biometric signature of the user received from the biometric scanner. In various embodiments, the determination can involve comparing a biometric template generated from a biometric signature received from a biometric reader/scanner with a reference biometric template associated with an authorized user stored in a memory.

At t=T7, a second ATR message is transmitted from the smart card 200 to the terminal 120 via the I/O pads within a second predetermined number of clock cycles (N2) after T5. In some embodiments, the second ATR message can include data items (indicated as ATR data #2) indicating whether the biometric authentication of the user was successful. In other embodiments, the reception of the second ATR itself indicates that the biometric authentication was successful. In other words, if the biometric authentication was not successful, the smart card does not send a second ATR message to the terminal. Either way, if the biometric authentication was successful, the smart card 200 and the terminal 120 exchange transaction-related messages via the I/O pads within a third predetermined number of allowed clock cycles (N4) after T7. At t=T8, the communication link between the smart card 200 and the terminal 120 is disconnected. In the illustrated example, power (Vcc) applied to the power pad is disabled, the clock is stopped, and the RST and I/O signals become low.

Figure 8:
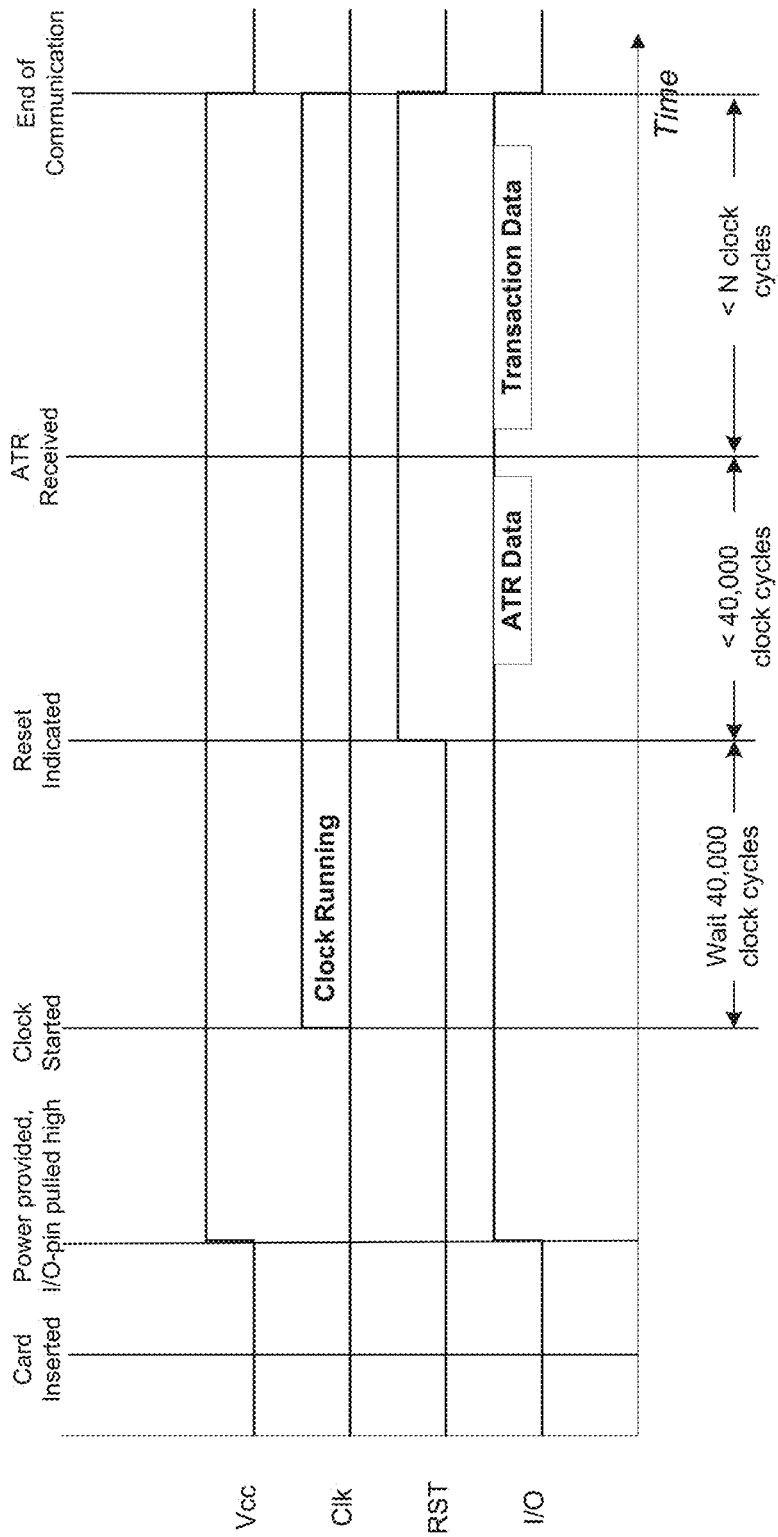
FIG. 8 is a signal timing diagram of a prior art single ATR process.

FIGS. 4 and 8, although showing different time periods, are not drawn to scale. For example, although ATR Data #2 and Transaction Data are shown as being similar in size, in reality Transaction Data may be much longer than ATR Data #2. FIGS. 4 and 8 merely describe the general transmission process and are not intended to describe the actual message or period lengths.

Figure 5:
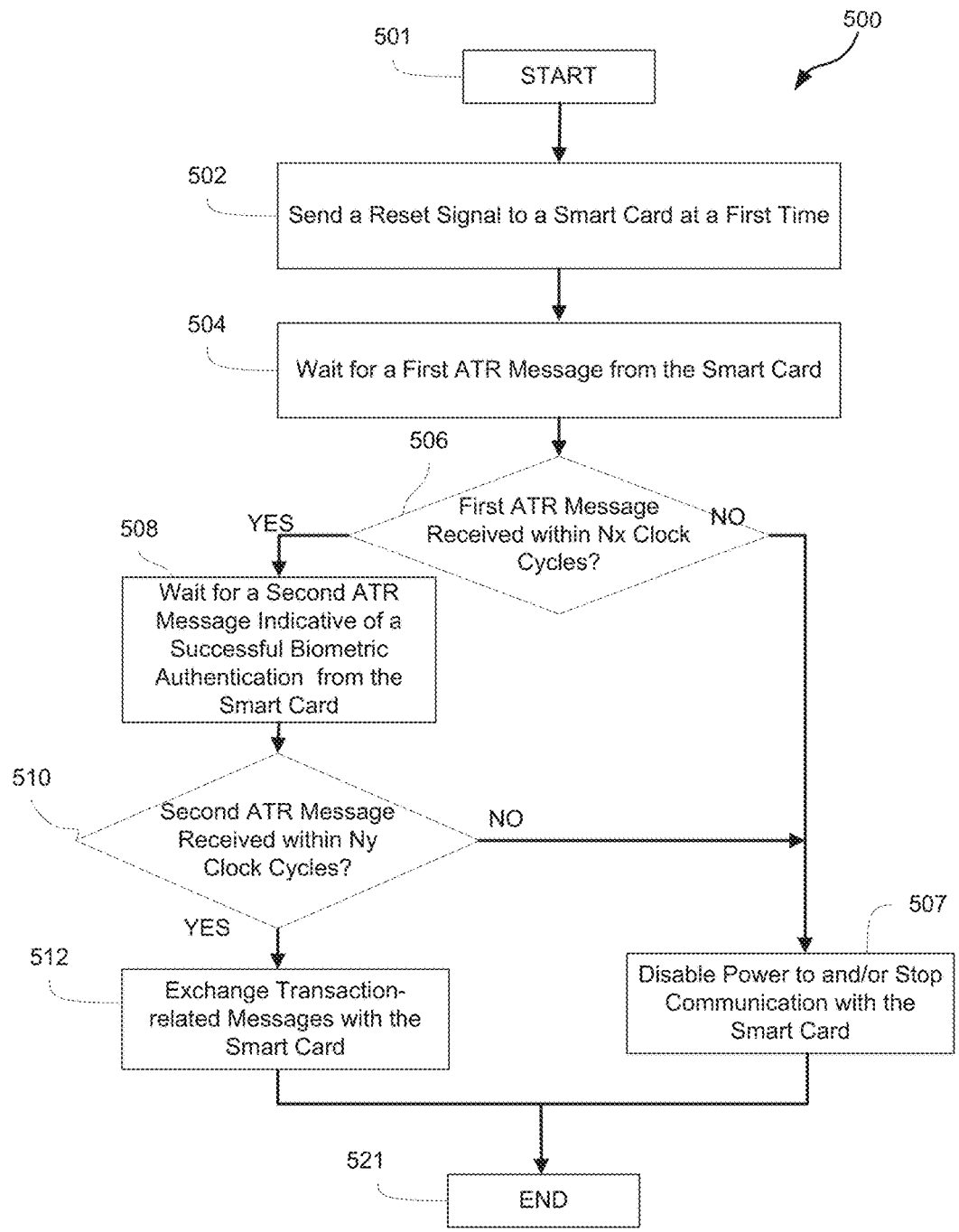
FIG. 5 is a flowchart illustrating an example startup and transaction process from the perspective of an example terminal in accordance with the present disclosure.

FIG. 5 is a flowchart illustrating an example startup and transaction process 500 between a biometric smart card and a terminal from the perspective of the terminal in accordance with the present disclosure. For ease of illustration only without any intent to limit the present disclosure in any way, the process 500 will be described with reference to the biometric smart card 200 and the terminal 120 of FIG. 3 and the signal timing diagram of FIG. 4. The process 500 starts at state 501 when the smart card 200 has been inserted into the terminal 120, and the terminal has already provided power to the smart card 200 through an electrical connection made via, for example, a pair of matching contact pads. The process 500 proceeds to operation 502 where the terminal 120 sends a reset (RST) signal to the smart card 200 through one of the contact pads (e.g., T4 of FIG. 4). The process 500 proceeds to operation 504 where the terminal 120 waits for a first ATR message from the smart card 200 and then to query state 506 where it is determined whether a first ATR message is received within a first predetermined number (Nx) of clock cycles (e.g., N1 of FIG. 4) after the reset. If a first ATR message is not received within Nx clock cycles after the reset, the process 500 proceeds to operation 507, where the communication link between the terminal 120 and the smart card 200 is disconnected by, for example, disabling power to the smart card and/or stopping communication with the smart card. The process 500 ends at state 521.

On the other hand, if, at the query state 506, it is determined that a first ATR message is received (e.g., via an I/O pad) at a first time (e.g., T5 of FIG. 4) that is within Nx clock cycles (e.g., N1 of FIG. 4) after the reset, the process 500 proceeds to operation 508 where the terminal 120 waits for a second ATR message indicative of a successful biometric authentication of the user from the smart card 200 and to query state 510 where it is determined whether a second ATR message is received within a second predetermined number (Ny) of clock cycles (e.g., N2 of FIG. 4) after the first time (when the first ATR message was received). If a second ATR message is not received within Ny clock cycles after the first time, the process 500 proceeds to operation 507 where the communication link between the terminal 120 and the smart card 200 is disconnected by, for example, disabling power to the smart card and/or stopping communication with the smart card, and the process 500 ends at state 521.

On the other hand, if, at the query state 510, a second ATR message indicative of a successful biometric authentication of the user is received at a second time that is within Nx clock cycles after the first time, the process 500 proceeds to operation 512 where the terminal 120 exchanges transaction-related messages with the smart card 200 during a third predetermined number of cycles (e.g., N3 of FIG. 4) after the second time. In some embodiments, the reception of the second ATR message itself indicates that the biometric authentication of the user was successful. In other embodiments, the second ATR message includes one or more data items (e.g., Data Item #2 of FIG. 4) that indicate whether the biometric authentication of the user was successful at the smart card 200. In such an embodiment, if the data items indicate that the biometric authentication was unsuccessful (e.g., no match), the process 500 proceeds to operation 507 where the communication link between the terminal and the smart card is disconnected and the process 500 ends at state 521.

Figure 6:
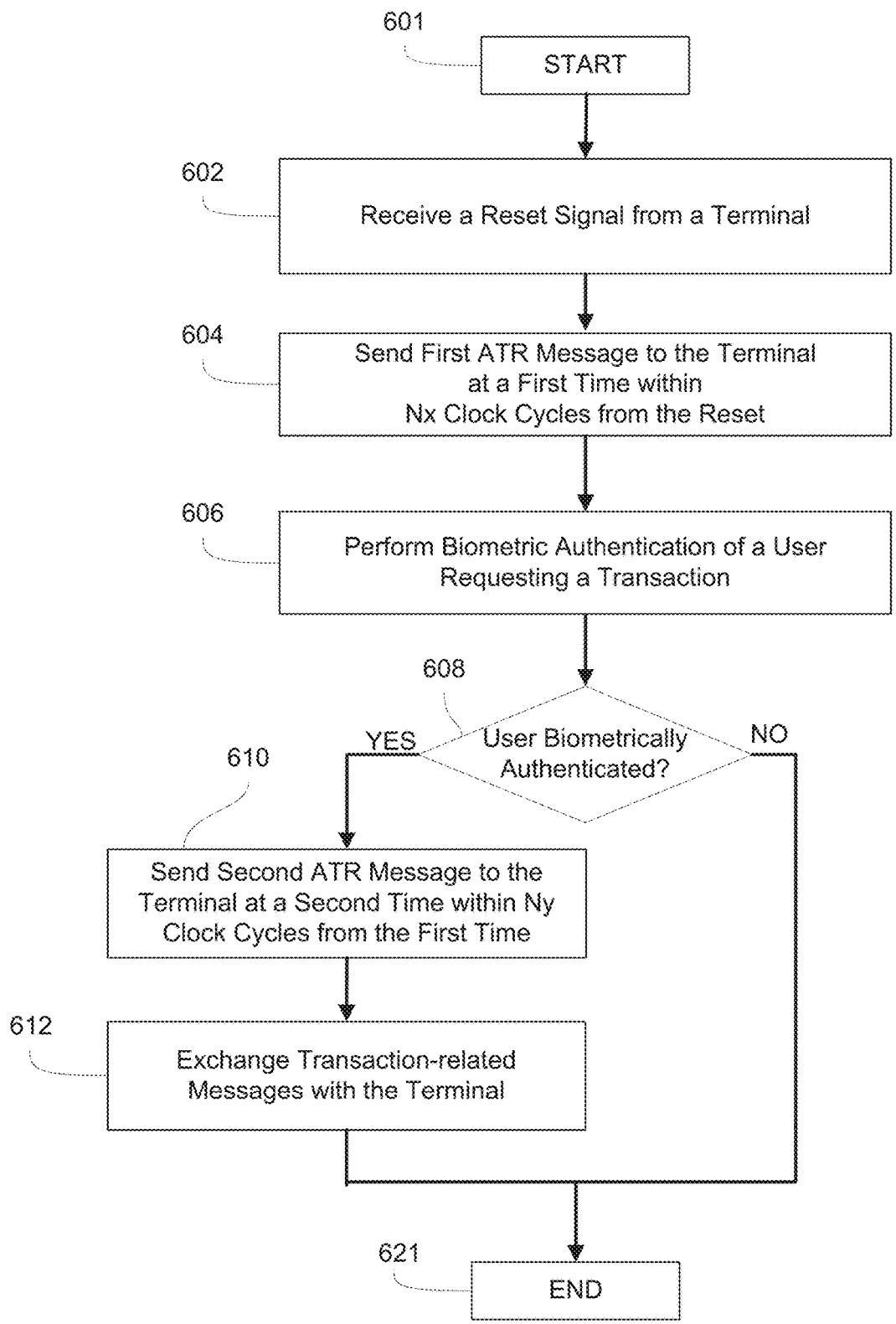
FIG. 6 is a flowchart illustrating an example startup and transaction process from the perspective of an example smart card in accordance with the present disclosure.

FIG. 6 is a flow chart illustrating an example startup and transaction process 600 between a biometric smart card and a terminal from the perspective of the smart card in accordance with the present disclosure. For ease of illustration only without any intent to limit the present disclosure in any way, the process 600 will be described with reference to the biometric smart card 200 and the terminal 120 of FIG. 3 and the signal timing diagram of FIG. 4. The process 600 starts at state 601 when the smart card 200 has already been inserted into the terminal 120, and the terminal has already provided power to the smart card 200 through an electrical connection made via, for example, a pair of matching contact pads as described above with respect to state 501 of FIG. 5. The process 600 proceeds to operation 602 where the smart card 200 receives a reset (RST) signal from the terminal 120 (e.g., at t=T4 of FIG. 4). In some embodiments, the RST signal is internally generated at the smart card 200 instead of being received from the terminal 120.

The process 600 proceeds to operation 604 where the smart card 200 sends a first ATR message to the terminal 120 (e.g., via an I/O pad) at a first time (e.g., T5 of FIG. 4) within a first predetermined number (Nx) of clock cycles (e.g., N1 of FIG. 4) after the reset. The process 600 proceeds to operation 606 where the smart card 200 performs a biometric authentication of the user requesting the transaction and to query state 608, where it is determined whether the biometric authentication of the user was successful. If the biometric authentication of the user was successful, the process 600 proceeds to operation 610, where the smart card 200 sends a second ATR message indicative of the successful biometric authentication to the terminal 120 (e.g., via the I/O pad) at a second time (e.g., T7 of FIG. 4) within a second predetermined number (Ny) clock cycles (e.g., N2 of FIG. 4) from the first time. The process proceeds to operation 612, where the smart card 200 exchanges transaction-related messages with the terminal 120 (e.g., via the I/O pad) during a third predetermined number of cycles (e.g., N3 of FIG. 4) after the second time. In some embodiments, the smart card 200 sends the second ATR message even if the biometric authentication was unsuccessful. In such an embodiment, the second ATR message can include one or more data items indicating whether the biometric authentication was successful.

Those skilled in the art shall understand that a smart card system utilizing two ATR messages in accordance with the present disclosure can perform a biometric authentication of a user without having the system timed out and the communication link between the terminal and the smart card disconnected. In this regard, the value of N2 clock cycles and the corresponding allowed time between the two ATR messages should be set sufficiently high to permit the biometric authentication. In various embodiments, the allowed time can be set to a value between 5 seconds to 30 seconds, depending on the type of biometric authentication employed. In some embodiments, more than two ATR messages may be utilized. A smart card system may employ multiple biometric authentications such as, for example, a fingerprint-based authentication and a voice-based authentication. In such a system, three ATR messages may be provided such that the second ATR message is sent after a successful fingerprint-based biometric authentication and the third ART message is sent after a successful voice-based biometric authentication.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 7:
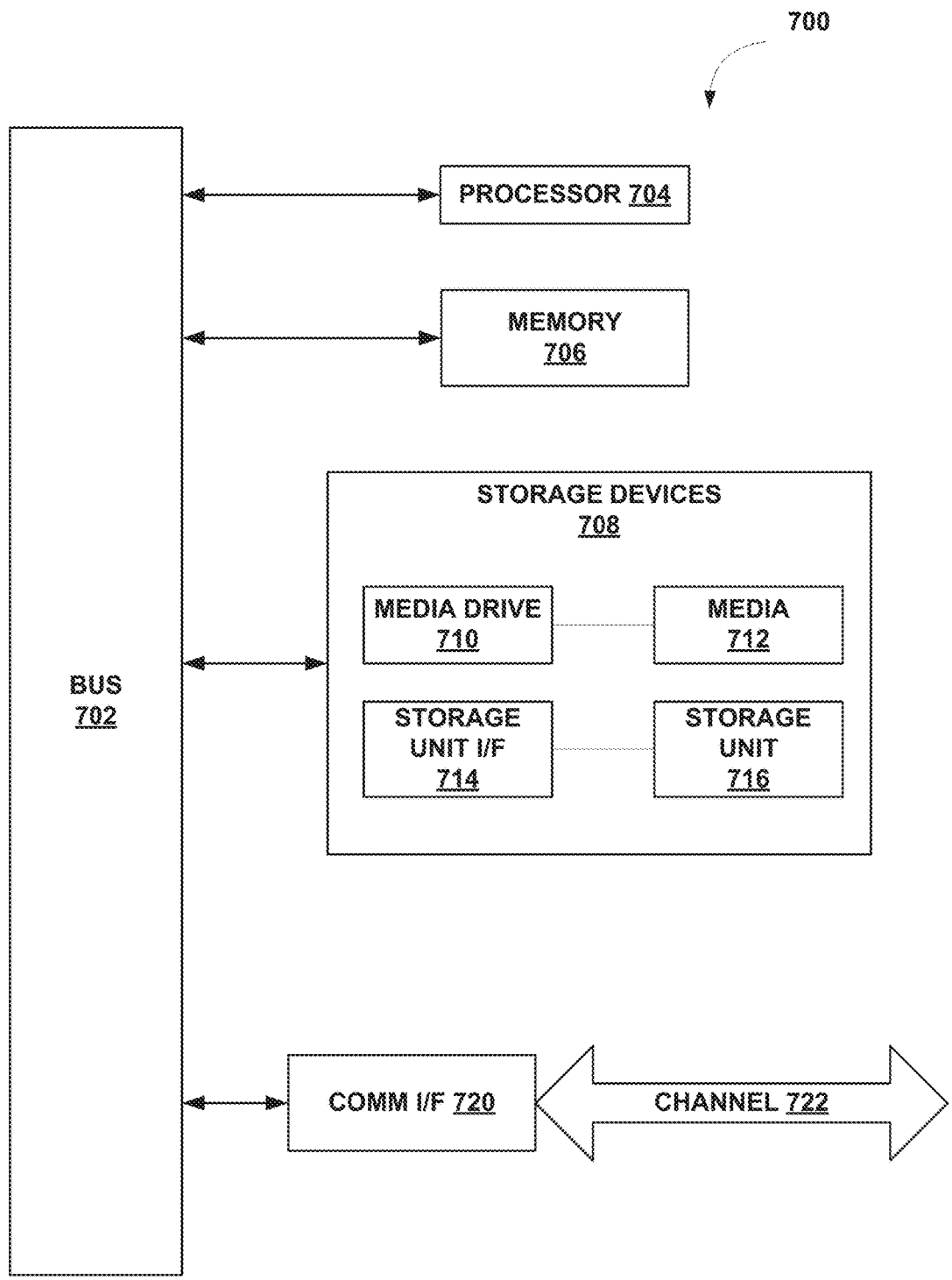
FIG. 7 is an example diagram of a computing module that may be used in implementing various features of embodiments of the technology disclosed herein.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the technology using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 706. For example, preferably random access memory (RAM) or other dynamic memory, might be used for storing information and instructions to be executed by processor 704. Main memory 706 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 708, which might include, for example, a media drive 710 and a storage unit interface 714. The media drive 710 might include a drive or other mechanism to support fixed or removable storage media 712. For example, a hard disk drive, a floppy disk drive, a magnetic tape drive, an optical disk drive, a CD or DVD drive (R or RW), or other removable or fixed media drive might be provided. Accordingly, storage media 712 might include, for example, a hard disk, a floppy disk, magnetic tape, cartridge, optical disk, a CD or DVD, or other fixed or removable medium that is read by, written to or accessed by media drive 710. As these examples illustrate, the storage media 712 can include a computer usable storage medium having stored therein computer software or data.

In alternative embodiments, information storage mechanism 708 might include other similar instrumentalities for allowing computer programs or other instructions or data to be loaded into computing module 700. Such instrumentalities might include, for example, a fixed or removable storage unit 716 and an interface 714. Examples of such storage units 716 and interfaces 714 can include a program cartridge and cartridge interface, a removable memory (for example, a flash memory or other removable memory module) and memory slot, a PCMCIA slot and card, and other fixed or removable storage units 716 and interfaces 714 that allow software and data to be transferred from the storage unit 716 to computing module 700.

Computing module 700 might also include a communications interface 720. Communications interface 720 might be used to allow software and data to be transferred between computing module 700 and external devices. Examples of communications interface 720 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 720 might typically be carried on signals, which can be electronic, electromagnetic (which includes optical) or other signals capable of being exchanged by a given communications interface 720. These signals might be provided to communications interface 720 via a channel 722. This channel 722 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 706, storage unit 716, media 712, and channel 722. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A method of facilitating communication between a smart card and a terminal comprising a physical processor and an interface configured to be coupled to the smart card, the method performed by the physical processor of the terminal, the method comprising:
the physical processor waiting for a first answer-to-reset (ATR) message from the smart card after a smart card reset,
the physical processor receiving a first ATR message via the interface at a first time that is within a first predetermined clock cycles after a smart card reset;
the physical processor waiting for a second ATR message indicative of a successful biometric authentication from the smart card;
the physical processor receiving the second ATR message indicative of the successful biometric authentication via the interface at a second time that is within a second predetermined clock cycles after the first time; and
the physical processor exchanging transaction-related messages with the smart card via the interface.

2. The method of claim 1, wherein the first ATR message comprises data items indicative of at least one of protocol format, type of smart card, and baud rate.

3. The method of claim 1, further comprising disconnecting a communication link between the terminal and the smart card if the first ATR message is not received within the first predetermined clock cycles after the smart card reset.

4. The method of claim 1, further comprising disconnecting a communication link between the terminal and the smart card if the second ATR message is not received within the second predetermined clock cycles after the first time.

5. The method of claim 1, wherein the exchanging step is performed, within a third predetermined clock cycles after the second time.

6. The method of claim 1, further comprising sending a signal indicative of the reset to the smart card.

7. A method of facilitating communication between a smart card, and a terminal, the smart card comprising an interface configured to be coupled to the terminal, a biometric module including a biometric sensor configured to obtain a first biometric sample of an authorized user, and one or more processors, the method performed by the one or more processors of the smart card, the method comprising:
the one or more processors sending a first answer-to-reset (ATR) message to the terminal via the interface at a first time that is within a first predetermined clock cycles after a smart card reset;
the one or more processors performing a biometric authentication of a user requesting a transaction by comparing the stored biometric reference template to a biometric template generated based on a second biometric sample of the user requesting the transaction obtained by the biometric sensor;
the one or more processors determining that the biometric authentication was successful, when there is a match between the stored biometric reference template and the biometric template;
the one or more processors sending a second ATR message indicative of a successful biometric authentication to the terminal via the interface at a second time that is within a second predetermined clock cycles after the first time; and
the one or more processors exchanging transaction-related messages with the terminal.

8. The method of claim 7, wherein the first ATR message comprises one or more data items indicative of at least one of protocol format, type of smart card, and baud rate.

9. The method of claim 7, wherein the second ATR message comprises one or more data items indicating that the biometric authentication was successful.

10. The method of claim 7, further comprising the smart card generating a signal indicative of the smart card reset.

11. A terminal for communicating with a smart card, comprising:
an interface configured to be coupled to a smart card;
a physical processor coupled to the interface and configured to:
wait for a first answer-to-reset (ATR) message from the smart card after a smart card reset,
receive the first ATR message via the interface at a first time that is within a first predetermined clock cycles after the smart card reset,
wait for a second ATR message indicative of a successful biometric authentication from the smart card;
receive the second ATR message indicative of the successful biometric authentication via the interface at a second time that is within a second predetermined clock cycles after the first time, and
exchange transaction-related messages with the smart card via the interface.

12. The terminal of claim 11, wherein the terminal is compliant with an ISO standard.

13. The terminal of claim 11, wherein the first ATR message comprises data items indicative of at least one of protocol format, type of smart card, and baud rate.

14. The terminal of claim 11, wherein the terminal provides power to the smart card via the interface.

15. The terminal of claim 14, wherein the processor is further configured to disable the power to the smart card if the first ATR message is not received within the first predetermined clock cycles after the first time.

16. The terminal of claim 15, wherein the processor is further configured to disable the power to the smart card if the second ATR message is not received within the second predetermined clock cycles after the second time.

17. The terminal of claim 13, wherein the interface comprises at least one input and output contact pad for exchanging messages with the smart card.

18. A smart card comprising:
an interface configured to be coupled to a terminal;
a biometric module including a biometric sensor configured to obtain a first biometric sample of an authorized user, and
one or more processors coupled to the interface and the biometric module and configured to:
send a first answer-to-reset (ATR) message to the terminal via the interface at a first time that is within a first predetermined clock cycles after a smart card reset,
perform a biometric authentication of a user requesting a transaction involving the smart card by comparing the stored biometric reference template to a biometric template generated based on a second biometric sample of the user requesting the transaction obtained by the biometric sensor, determine that the biometric authentication was successful, when there is a match between the stored biometric reference template and the biometric template, send a second ATR message indicative of a successful biometric authentication to the terminal via the interface at a second time that is within a second predetermined clock cycles after the first time, exchange transaction-related messages with the terminal.

19. The smart card of claim 18, wherein the smart card is compliant with an ISO standard.

20. The smart card of claim 18, wherein the first and second biometric samples are fingerprint images.

* * * * *